(12) United States Patent
Kneib et al.

(10) Patent No.: US 10,721,241 B2
(45) Date of Patent: Jul. 21, 2020

(54) METHOD FOR PROTECTING A VEHICLE NETWORK AGAINST MANIPULATED DATA TRANSMISSION

(71) Applicant: Robert Bosch GmbH, Stuttgart (DE)

(72) Inventors: Marcel Kneib, Mainhardt (DE); Michael Weber, Magstadt (DE)

(73) Assignee: Robert Bosch GmbH, Stuttgart (DE)

( * ) Notice: Subject to any disclaimer, the term of this patent is extended or adjusted under 35 U.S.C. 154(b) by 240 days.

(21) Appl. No.: 15/990,940

(22) Filed: May 29, 2018

(65) Prior Publication Data

US 2018/0359262 A1 Dec. 13, 2018

(30) Foreign Application Priority Data

Jun. 7, 2017 (DE) .......................... 10 2017 209 557

(51) Int. Cl.
*H04L 29/06* (2006.01)
*H04L 12/40* (2006.01)
*G06F 8/65* (2018.01)
*H04W 4/40* (2018.01)
*H04W 12/12* (2009.01)
*H04L 29/08* (2006.01)

(52) U.S. Cl.
CPC .............. *H04L 63/126* (2013.01); *G06F 8/65* (2013.01); *H04L 12/40* (2013.01); *H04L 12/40169* (2013.01); *H04L 63/1441* (2013.01); *H04L 63/1408* (2013.01); *H04L 63/1466* (2013.01); *H04L 67/12* (2013.01); *H04L 2012/40215* (2013.01); *H04W 4/40* (2018.02); *H04W 12/1202* (2019.01)

(58) Field of Classification Search
CPC ..... G06F 8/65; H04L 12/40169; H04L 12/40; H04L 63/1441
USPC ......................................................... 713/170
See application file for complete search history.

(56) References Cited

U.S. PATENT DOCUMENTS

| 5,379,304 | A | * | 1/1995 | Dell | ..................... | G06F 11/1044 714/758 |
| 5,541,941 | A | * | 7/1996 | Dell | ..................... | G06F 11/1044 714/800 |
| 7,310,696 | B1 | * | 12/2007 | Haechten | ................ | H04L 47/30 370/492 |

(Continued)

FOREIGN PATENT DOCUMENTS

DE 102009026995 A1 3/2011
DE 102015219996 A1 4/2017

*Primary Examiner* — Monjur Rahim
(74) *Attorney, Agent, or Firm* — Norton Rose Fulbright US LLP; Gerard Messina

(57) ABSTRACT

A method is provided for protecting a vehicle network of a vehicle against manipulated data transmission. The vehicle network includes multiple network nodes. At least one first network node in the vehicle network compares received messages with messages assigned to the first network node and detects the manipulated data transmission if one of the received messages coincides with a message assigned to the first network node, but the first network node did not send the message. At the same time, the first network node compares only selected messages of the received messages with the messages assigned to the first network node or compares the received messages only with selected messages assigned to the first network node.

9 Claims, 1 Drawing Sheet

(56) References Cited

U.S. PATENT DOCUMENTS

| | | | | |
|---|---|---|---|---|
| 8,555,344 | B1* | 10/2013 | Wiedmann | H04W 12/0609 726/4 |
| 2002/0120902 | A1* | 8/2002 | Brown | H04L 1/0057 714/776 |
| 2005/0021979 | A1* | 1/2005 | Wiedmann | H04L 29/12009 713/182 |
| 2005/0143050 | A1* | 6/2005 | Foll | H04L 29/06 455/406 |
| 2005/0183143 | A1* | 8/2005 | Anderholm | G06F 11/32 726/22 |
| 2006/0212905 | A1* | 9/2006 | Matsuda | H04H 20/28 725/51 |
| 2008/0307219 | A1* | 12/2008 | Karandikar | H04L 63/166 713/153 |
| 2009/0013412 | A1* | 1/2009 | Nather | G06F 21/445 726/27 |

\* cited by examiner

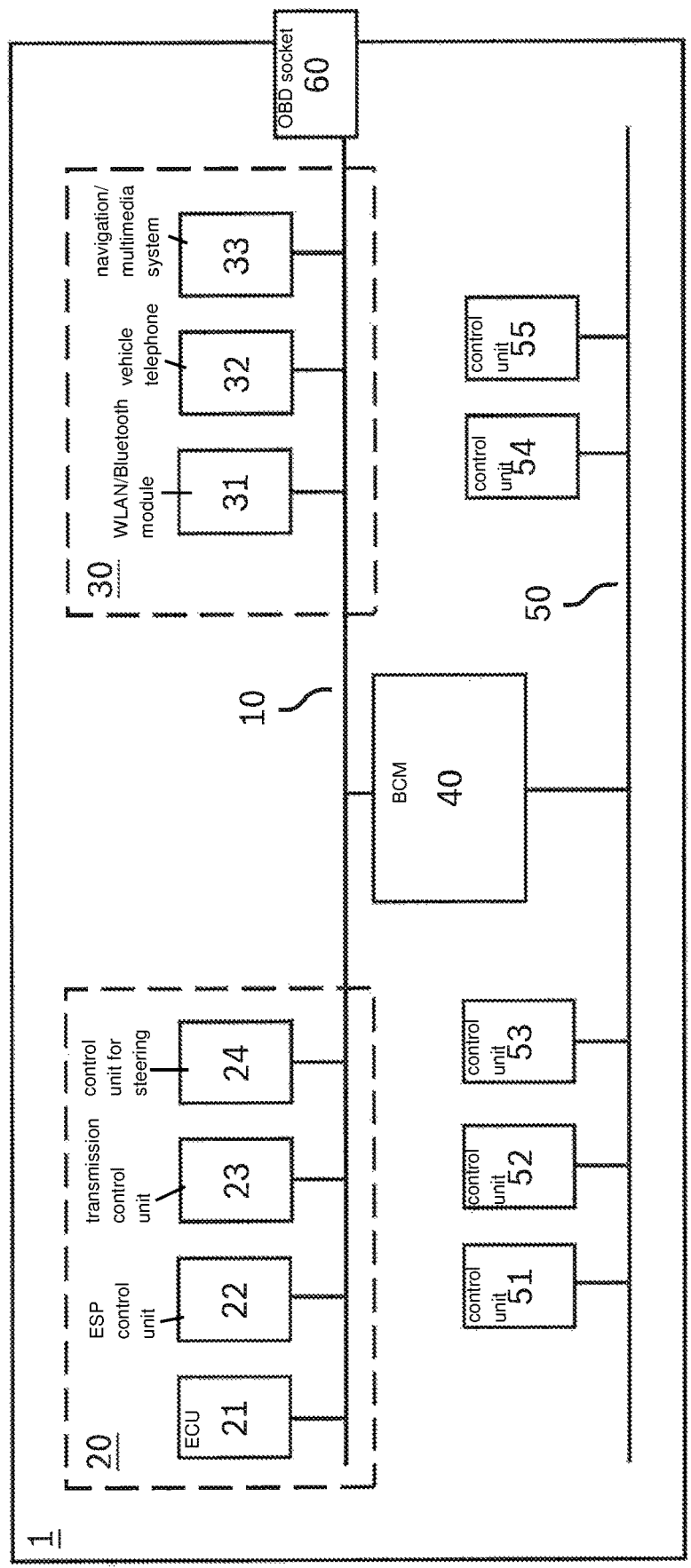

METHOD FOR PROTECTING A VEHICLE NETWORK AGAINST MANIPULATED DATA TRANSMISSION

CROSS REFERENCE

The present application claims the benefit under 35 U.S.C. § 119 of German Patent Application No. DE 102017209557.1 filed on Jun. 7, 2018, which is expressly incorporated herein by reference in its entirety.

FIELD

Methods are presented for protecting a vehicle network against manipulated data transmission, as well as a computer program configured for this purpose.

BACKGROUND INFORMATION

A method for averting a manipulation on a CAN bus by a node connected to the bus with the aid of a CAN controller is described in German Patent Application No. DE 10 2015 219 996 A1. In this method, a secured transmission module of the first node monitors the bus and detects transmission processes of the CAN controller in a normal operation of the first node. The transmission module also detects a message inadmissibly transmitted on the bus in a manner that deviates from the normal operation and, if the transmission module detects the message, initiates countermeasures provided against the manipulation.

German Patent Application No. DE 10 2009 026 995 A1 describes a method for operating a bus system, in particular, a CAN bus, to which multiple stations are connectable. A transmitted message includes an identifier, whereby a particular identifier may always only be used by a single station. Each of the stations compares the identifier of a transmitted message with the identifiers used by the station itself. An error message is generated in the event of coincidence.

SUMMARY

Example methods are provided, with which a network of a vehicle and, therefore, the vehicle may be protected against manipulated data transmission or may be reinforced against such an attack. In such case, the vehicle network includes multiple network nodes, at least one first network node in the vehicle network checking received messages as to whether the received messages are the messages assigned to the first network node, but were not transmitted by the first network node. This takes place via a comparison of the received messages with the assigned messages. The comparison can be made, in particular, based on identification information of the messages. The network node detects the manipulated data transmission if one of the received messages coincides with a message assigned to the first network node, but was not transmitted by the first network node.

In accordance with the present invention, the first network node does not compare all, but rather only selected messages of the received messages with messages assigned to it, or compares the received messages not with all messages, but rather only with selected messages of the messages assigned to it. This makes a specifically targeted and resource-efficient method possible. For this purpose, it is possible in a preferred embodiment for particular assigned messages to be determined in the network node (for example by storing identification information about these messages), for which a comparison is to be made. As a result, fewer comparisons are necessary and the method may focus on messages that are particularly security-critical and uniquely assigned to the network node. In another preferred embodiment in accordance with the present invention, a part of the messages is selected for the comparison using selection criteria stored in the network node. In this way, the resources in the network node are also conserved. If the selection is not made deterministically or randomly, the attacker cannot predict which of the received messages are compared or checked, which impedes an attack.

These approaches are implementable without additional hardware and may therefore be simply implemented in software or transferred in a retrofit package as a software update to existing systems, such as previously delivered vehicles.

An additional advantage of this approach is that it may be implemented regardless of the vehicle variant (coupe, limousine, cabrio, various transmissions, various engines, etc.), since each network node, in particular, each control unit, monitors itself. Therefore, no special adaptation to the other network nodes must take place.

If a network node detects a manipulation of the data transmission based on a received message, which actually only the network node itself is supposed to transmit, but did not do so, it then preferably initiates countermeasures. The following measures have proven advantageous, if necessary, also in combination:

- deactivating the vehicle network or a part of the vehicle network,
- invalidating the first message,
- sending out an error message, in particular, as an additional diagnostic message or as manipulated information in an additional message assigned to the first network node, in particular, in a test section of the additional message,
- refraining from transmitting specific, in particular, security-critical messages,
- ignoring messages received by at least the first network node of the multiple network nodes in the vehicle network,
- shifting the vehicle into an emergency mode having limited functionality,
- resetting information in the vehicle network after switching the ignition off and on.

BRIEF DESCRIPTION OF THE DRAWING

The present invention is described in greater detail below with reference to the FIGURE and based on exemplary embodiments.

FIG. 1 schematically shows an exemplary vehicle network including multiple network participants or network nodes.

DETAILED DESCRIPTION OF EXAMPLE EMBODIMENTS

The present invention relates to a method for protecting a vehicle network against manipulated data transmission.

Vehicle networks are usually made up of different network nodes, most commonly, control unit nodes, which are interconnected to one another via bus systems, presently primarily CAN, LIN FlexRay and MOST. One component per bus system is installed in the control unit hardware, which takes over the communication both in the transmitting as well as in the receiving direction. The control unit nodes also have a processing unit that executes a computer program. This program is frequently configured in such a way that a specific number of messages may be transmitted and a specific number of messages may be received by one control unit node. These sets of messages are regularly disjunct if the control unit is not a bridge or a gateway of the bus system.

FIG. 1 schematically shows an exemplary vehicle network 1. This network includes a main bus 10, with which a group of security-critical network nodes 20, as well as a group of network nodes having a radio link 30 are connected. The group of security-critical network nodes 20 includes, for example, an engine control unit 21, an ESP control unit 22, a transmission control unit 23 and a control unit for the steering 24. The group of network nodes having radio link 30 includes, for example, a WLAN and/or Bluetooth module 31, an integrated vehicle telephone 32 and a combination navigation and multimedia system 33. An OBD socket 60 is also connected to the main bus and is configured as a vehicle-external network or a vehicle-externally directed interface.

A so-called body control unit 40 (body controller, BCM) is connected to both main bus 10 as well as to an additional bus 50. Additional network nodes, in particular, control units 51 through 55 are also connected to additional bus 50.

Conventional attacks on vehicle networks in many cases manipulate standard messages or diagnostic messages in such a vehicle network 1. In such case, messages are transmitted from control units, which are not actually provided for such purpose. They are often transmitted at a, in part, significantly higher data rate in order to get through or to prevail on the bus system as opposed to the regular messages.

The bus types prevalent in the vehicle often function so that all messages transmitted are received by all network nodes. It is generally not apparent to the receiving network node which (other) network node has transmitted a particular received message. In general, there is also no 1:1 communication. This makes it extremely difficult to detect whether a received message comes from the correct sender.

Attacks on vehicle networks, which are aimed at manipulating a data transmission in the vehicle network, are often carried out remotely, i.e., via radio interfaces. Such an attack may, for example, be subdivided into three steps:

1. Malicious take-over of a remote-enabled control unit from afar.
2. Manipulation of the control unit so that the control unit transmits specific messages to a security-critical control unit.
3. Thereby inducing the security-critical control unit to carry out undesired, in particular, unsecured operations.

Protection against such an attack or against a data transmission manipulated in this way may take place by each control unit node monitoring the bus for messages, which are normally transmitted by the control unit node itself or may be allowed to be transmitted only by the control unit node itself. If a message is detected by a control unit node, which the control unit node itself did not transmit, then an attack or a corresponding manipulation of the data transmission may exist, and a suitable counter-response is initiated.

However, the resource expenditure for such a measure may increase sharply in particular in the case of more complex network structures, for example, if a large number of received messages must be compared with a large number of messages assigned to the control unit node. In addition, there may be network protocols, according to which messages may not necessarily be assigned to just one control unit node. Such messages should then preferably be omitted from the comparison. Thus, for a more targeted and more resource-efficient protective measure, it is provided that not all received messages are checked or compared with assigned messages, or that the received messages are not compared with all assigned messages. Instead, in one preferred embodiment, specific assigned messages may be stored in the control unit node, for which a comparison with received messages is to take place. These are preferably particularly security-critical messages, which are also uniquely assigned to this control unit node. A control unit node may also make a rule-based or random, or non-deterministic selection of a subset of the received messages for a comparison or for a check.

Various responses to or countermeasures against a detected manipulation of the data transmission may be provided in the vehicle network. The main goal should be to ensure a reliable operation of the vehicle. If this is not possible, the operation of the vehicle should then be prevented.

An initial hurdle is how the network node detecting the data manipulation may also include the other network nodes in the countermeasure or how it may communicate to the other network nodes that an attack has been detected.

Various options include:
deactivating the network or a part of the network,
invalidating the message,
"concealing" the information in a legitimate message (for example, a false CRC code),
an additional diagnostic message, which is transmitted on-demand,
no longer transmitting a legitimate message.

The last-mentioned measure would also function, for example, if the network or the bus is flooded with several messages by the attacker. In this case, the message would necessarily remain unsent.

A second point is how the other control units are to respond thereto. Here, it is desirable to give the attacker as few clues as possible, which the attacker could use for a refinement or expansion of the attack. This may happen in that all control units no longer trust, in particular, simply ignore, the network or a part of the network. As a result, the attacker is no longer able to continue searching for weak spots.

In addition, errors could also be set in the error memory that may only be reset in the repair shop. Shifting the vehicle into an emergency driving mode is another option, as is a resetting of information in the network after a switching off and on of the ignition.

The approaches provided require neither additional hardware nor an intervention in existing hardware. Thus, it is easily possible to retrofit vehicles or vehicle networks via a software update with such an attack detection or with such protection against a manipulation of the data transmission.

What is claimed is:

1. A method for protecting a vehicle network of a vehicle against manipulated data transmission, the vehicle network including multiple network nodes, the method comprising:
    comparing, by at least one first network node in the vehicle network, received messages with messages assigned to the first network node; and
    detecting the manipulated data transmission, when one of the received messages coincides with a message assigned to the first network node, but which the first network node did not transmit;
    wherein the first network node one of: (i) compares only selected messages of the received messages and not all of the received messages with the messages assigned to the first network node, or (ii) compares the received messages only with selected messages assigned to the first network node and not all messages assigned to the first network node.

2. The method as recited in claim 1, wherein a set of messages assigned to the first network node selected for the comparison is established in the first network node.

3. The method as recited in claim 1, wherein a rule is stored in the first network node as to which of the received messages are selected for a comparison.

4. The method as recited in claim 1, wherein a non-deterministic or random selection of the received messages for a comparison is made by the first network node.

5. The method as recited in claim 1, wherein the first network node initiates a countermeasure for protecting the vehicle network when it detects the manipulated data transmission.

6. The method as recited in claim 5, wherein the countermeasure includes at least one of:
- deactivating the vehicle network or a part of the vehicle network,
- invalidating a message,
- sending out an error message as an additional diagnostic message or as manipulated information in an additional message assigned to the first network node in a test section of the additional message,
- refraining from transmitting specific security-critical messages,
- ignoring messages received in the vehicle network by at least the first network node of the multiple network nodes,
- shifting the vehicle into an emergency mode having limited functionality,
- resetting information in the vehicle network after switching the ignition off and on.

7. A non-transitory machine-readable memory medium on which is stored a computer program for protecting a vehicle network of a vehicle against manipulated data transmission, the vehicle network including multiple network nodes, the computer program, when executed by a processing unit, causing the processor to perform:
- comparing, by at least one first network node in the vehicle network, received messages with messages assigned to the first network node; and
- detecting the manipulated data transmission, when one of the received messages coincides with a message assigned to the first network node, but which the first network node did not transmit;
- wherein the first network node one of: (i) compares only selected messages of the received messages and not all of the received messages with the messages assigned to the first network node, or (ii) compares the received messages only with selected messages assigned to the first network node and not all messages assigned to the first network node.

8. A control unit in a vehicle, comprising:
a processing unit; and
a non-transitory machine-readable memory medium on which is stored a computer program for protecting a vehicle network of a vehicle against manipulated data transmission, the vehicle network including multiple network nodes, the computer program, when executed by the processing unit, causing the processing unit to perform:
- comparing, by at least one first network node in the vehicle network, received messages with messages assigned to the first network node; and
- detecting the manipulated data transmission, when one of the received messages coincides with a message assigned to the first network node, but which the first network node did not transmit;
- wherein the first network node one of: (i) compares only selected messages of the received messages and not all of the received messages with the messages assigned to the first network node, or (ii) compares the received messages only with selected messages assigned to the first network node and not all messages assigned to the first network node.

9. A method for protecting a vehicle network of a previously delivered vehicle against manipulated data transmission, the method comprising:
uploading via a software update on at least one control unit of the vehicle network, a computer program, for protecting a vehicle network of a vehicle against manipulated data transmission, the vehicle network including multiple network nodes, the computer program, when executed by a processing unit of the control unit, causing the processing unit to perform:
- comparing, by at least one first network node in the vehicle network, received messages with messages assigned to the first network node; and
- detecting the manipulated data transmission, when one of the received messages coincides with a message assigned to the first network node, but which the first network node did not transmit;
- wherein the first network node one of: (i) compares only selected messages of the received messages and not all of the received messages with the messages assigned to the first network node, or (ii) compares the received messages only with selected messages assigned to the first network node and not all messages assigned to the first network node.

* * * * *